United States Patent
Kanzaki et al.

(10) Patent No.: US 12,545,124 B2
(45) Date of Patent: Feb. 10, 2026

(54) CONTROL SYSTEM FOR ELECTRIC VEHICLE

(71) Applicant: Toyota Jidosha Kabushiki Kaisha, Toyota (JP)

(72) Inventors: Kentaroh Kanzaki, Toyota (JP); Yasunori Matsumoto, Toyota (JP); Yoichiro Isami, Mishima (JP); Yuta Tsukada, Toyota (JP); Hiroyuki Amano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 533 days.

(21) Appl. No.: 18/147,865

(22) Filed: Dec. 29, 2022

(65) Prior Publication Data

US 2023/0234589 A1 Jul. 27, 2023

(30) Foreign Application Priority Data

Jan. 24, 2022 (JP) .................................. 2022-008605

(51) Int. Cl.
*B60L 15/20* (2006.01)
*B60W 10/08* (2006.01)
(Continued)

(52) U.S. Cl.
CPC ......... *B60L 15/2081* (2013.01); *B60W 10/08* (2013.01); *B60W 10/184* (2013.01);
(Continued)

(58) Field of Classification Search
CPC ........... B60W 30/18027; B60W 10/08; B60W 10/184; B60W 30/18118; B60W 40/09;
(Continued)

(56) References Cited

U.S. PATENT DOCUMENTS

2008/0060861 A1* 3/2008 Baur ....................... B60K 1/00
180/65.6
2008/0086252 A1 4/2008 Nakayama
(Continued)

FOREIGN PATENT DOCUMENTS

CN 110242421 A 9/2019
CN 109177742 B 6/2020
(Continued)

OTHER PUBLICATIONS

Translation of CN109177742B (Year: 2019).*

*Primary Examiner* — Frederick M Brushaber
(74) *Attorney, Agent, or Firm* — Oblon, McClelland, Maier & Neustadt, L.L.P.

(57) ABSTRACT

A control system for an electric vehicle configured to simulate an engine stall which might occur in conventional vehicles while preventing the simulation of the engine stall in an unfavorable situation. A controller of the control system is configured to: execute an engine stall control to simulate a behavior of the conventional vehicle in a situation where an engine stall occurs by stopping a motor, when a virtual engine speed calculated by a virtual engine speed calculator falls below a predetermined speed; and execute a hold assist control to apply a brake torque to the wheel by the brake device upon execution of the engine stall control.

11 Claims, 5 Drawing Sheets

(51) Int. Cl.
*B60W 10/184* (2012.01)
*B60W 30/18* (2012.01)
*B60W 40/09* (2012.01)

(52) U.S. Cl.
CPC ...... *B60W 30/18118* (2013.01); *B60W 40/09* (2013.01); *B60W 2510/083* (2013.01); *B60W 2540/10* (2013.01); *B60W 2540/14* (2013.01)

(58) Field of Classification Search
CPC ....... B60W 2510/083; B60W 2540/10; B60W 2540/14; B60W 2540/30; B60W 50/08; B60W 50/14; B60W 2540/16; B60W 2710/083; B60L 2240/421; B60L 2240/423; B60L 2240/48; B60L 15/2054; B60L 15/2072; B60L 15/2081; B60L 15/20; B60L 15/2009; Y02T 10/72

See application file for complete search history.

(56) References Cited

U.S. PATENT DOCUMENTS

| | | | | |
|---|---|---|---|---|
| 2012/0083958 | A1* | 4/2012 | Ballard | B60W 50/10 |
| | | | | 701/56 |
| 2015/0199955 | A1* | 7/2015 | Draganic | G08B 6/00 |
| | | | | 381/86 |
| 2016/0016091 | A1* | 1/2016 | Allmendinger | A63H 30/04 |
| | | | | 446/456 |
| 2021/0229550 | A1 | 7/2021 | Isami | |

FOREIGN PATENT DOCUMENTS

| | | | | |
|---|---|---|---|---|
| JP | 2008-94142 | A | 4/2008 | |
| JP | 6787507 | B1 | 11/2020 | |
| WO | WO-2020095280 | A1 * | 5/2020 | B60L 7/18 |

* cited by examiner

CONTROL SYSTEM FOR ELECTRIC VEHICLE

CROSS-REFERENCE TO RELATED APPLICATIONS

The present disclosure claims the benefit of Japanese Patent Application No. 2022-008605 filed on Jan. 24, 2022 with the Japanese Patent Office.

BACKGROUND

Field of the Invention

Embodiments of the present disclosure relate to the art of a control system for an electric vehicle having an electric motor as a prime mover configured to simulate behaviors of conventional vehicles having engines and manual transmissions.

Discussion of the Related Art

JP-B2-6787507 describes one example of an electric vehicle in which a motor is connected to drive wheels through gear mechanism and a propeller shaft. The electric vehicle described in JP-B2-6787507 is provided with a control system configured to operate the electric vehicle in such a manner as to simulate behavior of a conventional vehicle in which a manual transmission is interposed between an engine and drive wheels. According to the teachings of JP-B2-6787507, the control system is configured to control an output torque of the motor based on operations of an accelerator pedal, a shift lever, and a clutch pedal. Specifically, the control system is configured to calculate an output torque of a virtual engine based on an operation of the accelerator pedal, and calculate an output torque of the motor by multiplying the calculated output torque of the virtual engine by a gain corresponding to a position of the clutch pedal. In addition, the control system is further configured to calculate a speed of the virtual engine.

According to the teachings of JP-B2-6787507, it is possible to simulate a behavior of the conventional vehicle in the event of an engine stall, when the clutch pedal is returned in a situation where the accelerator pedal is not depressed sufficiently. To this end, specifically, the output torque of the motor is reduced to zero. Therefore, if the engine stall is simulated on an upslope, a rollback of the electric vehicle may occur. However, if such simulation of the engine stall is inhibited, driving pleasure of the electric vehicle would be unsatisfactory.

SUMMARY

Aspects of embodiments of the present disclosure have been conceived noting the foregoing technical problems, and it is therefore an object of the present disclosure to provide a control system for an electric vehicle configured to simulate an engine stall which might occur in conventional vehicles while preventing the simulation of the engine stall in an unfavorable situation.

The control system according to the exemplary embodiment of the present disclosure is applied to an electric vehicle having a rotary machine that delivers a torque to a wheel and a brake device that applies a brake torque to the wheel, but without having an engine, a transmission connected to the engine, and a clutch device. In order to achieve the above-explained objective, according to the exemplary embodiment of the present disclosure, the control system is provided with: an operating device of an accelerator that is manipulated by a driver to accelerate and decelerate the electric vehicle; an operating device of a shifting device that is manipulated by the driver to imitate an operation of a manual transmission of a conventional vehicle having the manual transmission; a virtual torque transmitting capacity changing device that is manipulated to imitate an operation of a clutch of the conventional vehicle; and a controller that controls the brake device. The controller comprises a virtual engine speed calculator that calculates a virtual engine speed as a speed of an engine of the conventional vehicle in an actual running condition of the electric vehicle based on positions of the operating device of the accelerator and the virtual torque transmitting capacity changing device. Specifically, the controller is configured to: execute an engine stall control to simulate a behavior of the conventional vehicle in a situation where an engine stall occurs by stopping the rotary machine, when the virtual engine speed calculated by the virtual engine speed calculator falls below a predetermined speed; and execute a hold assist control to apply the brake torque to the wheel by the brake device upon execution of the engine stall control.

In a non-limiting embodiment, the controller may be further configured to: determine an output torque of the rotary machine based on the position of the operating device of the accelerator; and inhibit a torque generation of the rotary machine based on the position of the operating device of the accelerator upon execution of the engine stall control.

In a non-limiting embodiment, the controller may be further configured to instruct a driver to launch the electric vehicle upon execution of the engine stall control.

In a non-limiting embodiment, the control system may further comprise an operating device of the brake device that is manipulated by the driver to control the brake torque established by the brake device. In addition, the controller may be further configured to instruct the driver to operate the operating device of the brake device to increase the brake torque, and to operate the virtual torque transmitting capacity changing device to reduce a gain of a virtual torque transmitting capacity, so as to launch the electric vehicle upon execution of the engine stall control.

In a non-limiting embodiment, the controller may be further configured to terminate the engine stall control when the operating device of the brake device and the virtual torque transmitting capacity changing device are operated.

In a non-limiting embodiment, the controller may be further configured to: determine a driving skill of the driver; and execute the hold assist control if the driving skill of the driver is low.

In a non-limiting embodiment, the controller may be further configured to execute the hold assist control if the driving skill of the driver is high and the electric vehicle is stopped on a slope.

In a non-limiting embodiment, the controller may be further configured to execute the hold assist control if the driving skill of the driver is high and another vehicle exists in a rolling direction of the electric vehicle.

In a non-limiting embodiment, the controller may be further configured to terminate the hold assist control if the electric vehicle is in a condition ready to be launched.

In a non-limiting embodiment, the controller may be further configured to execute a launch assist control upon execution of the engine stall control in order not to execute the engine stall control again.

In a non-limiting embodiment, the launch assist control may include a control to inhibit an execution of the engine stall control by setting a lower limit value of the virtual engine speed calculated by the virtual engine speed calculator to the predetermined speed or higher.

As described, the control system according to the exemplary embodiment of the present disclosure calculates the virtual engine speed based on positions of the operating device of the accelerator and the virtual torque transmitting capacity changing device. When the virtual engine speed calculated by the virtual engine speed calculator falls below a predetermined speed, the controller executes the engine stall control to simulate the behavior of the conventional vehicle in a situation where an engine stall occurs by stopping the rotary machine. In this situation, the torque generation by the rotary machine is stopped, therefore, the control system executes the hold assist control to apply the brake torque to the wheel by the brake device. According to the exemplary embodiment of the present disclosure, therefore, a roll-back of the electric vehicle may be prevented when releasing the operating device of the brake device while depressing the virtual torque transmitting capacity changing device to launch the electric vehicle. That is, it is not necessary to inhibit an execution of the engine stall control even in the unfavorable situation, and hence the behavior of the conventional vehicle having an engine and a manual transmission may be simulated in detail.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
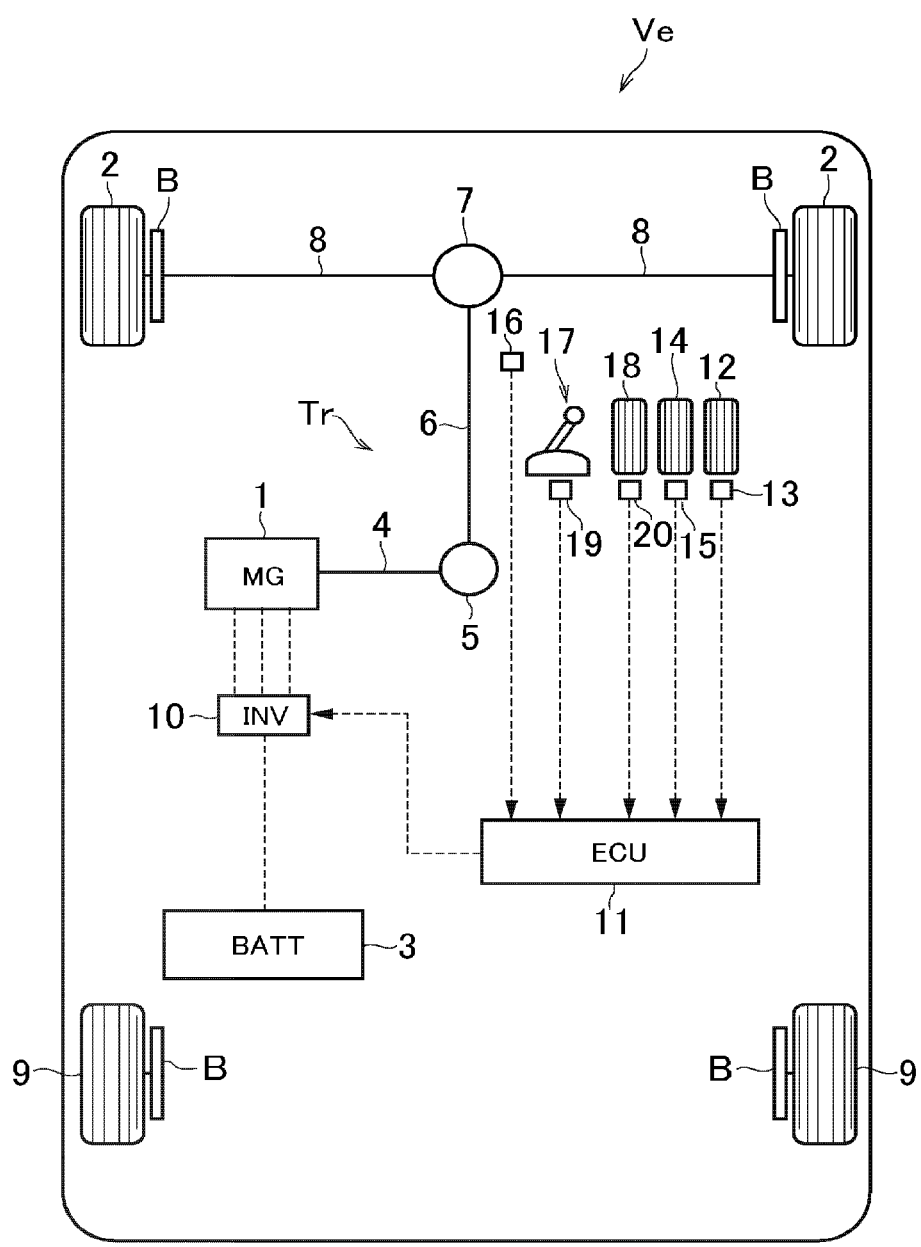
FIG. 1 is a schematic illustration showing one example of a structure of an electric vehicle to which the control system according to the exemplary embodiment of the present disclosure is applied.

Referring now to FIG. 1, there is shown one example of a structure of an electric vehicle (hereinafter simply referred to as a vehicle) Ve to which the control system according to the embodiment of the present disclosure is applied. The vehicle Ve shown in FIG. 1 is a front drive layout electric vehicle propelled by delivering an output torque of a motor (referred to as "MG" in FIG. 1) 1 as a rotary machine to a pair of front wheels 2. According to the exemplary embodiment of the present disclosure, a motor/generator that serves not only as a motor but also as a generator is adopted as the motor 1. Specifically, the motor 1 serves as a motor to generate a driving torque to propel the vehicle Ve by supplying electric power to the motor 1 from an electric storage device (referred to as "BATT" in FIG. 1) 3. The motor 1 also serves as a generator to generate electric power when rotated passively by a torque delivered thereto. For example, a synchronous motor and an induction motor may be adopted as the motor 1.

An output shaft 4 of the motor 1 is connected to one end of a propeller shaft 6 through a gear unit 5, and the other end of the propeller shaft 6 is connected to a differential gear unit 7. That is, the output torque of the motor 1 is distributed to right and left driveshafts 8 through the differential gear unit 7, and further distributed to the front wheels 2 through the driveshafts 8 to propel the vehicle Ve. Thus, the vehicle Ve is not provided with an engine, a transmission to be connected to the engine 1, and a clutch mechanism that selectively interrupt torque transmission between the engine and a pair of drive wheels. Each of the front wheels 2 and rear wheels 9 are individually provided with a brake device B so that the front wheels 2 and rear wheels 9 are braked by brake torques established by the brake devices B.

Instead, the control system according to the exemplary embodiment of the present disclosure may also be applied to a rear-drive layout electric vehicle in which the output torque of the motor 1 is delivered to the pair of the rear wheels 9, or a four-wheel-drive layout electric vehicle in which the output torque of the motor 1 is distributed not only to the front wheels 2 but also to the rear wheels 9 through a transfer.

The motor 1 is provided with an inverter (referred to as "INV" in FIG. 1) 10 so that a magnitude and a frequency of an electric current supplied to each phase of the motor 1 are controlled by the inverter 10, and the inverter 10 is connected to an electric storage device (referred to as "BATT" in FIG. 1) 3 that discharges a direct current. As an option, an auxiliary such as a converter may be arranged to boost a voltage of electric power supplied from the electric storage device 3. In addition, the electric storage device 3 may include a secondary battery such as a lithium-ion battery and an electronic component such as a capacitor.

In order to control e.g., a switch element of the inverter 10 and the brake devices B, the vehicle Ve is provided with an electronic control unit (to be abbreviated as the "ECU" hereinafter) 11 as a controller. The ECU 11 comprises a microcomputer as its main constituent configured to perform calculation based on incident data from sensors and formulas as well as maps install in advance. For example, calculation results are transmitted from the ECU 11 in the form of command signals to the inverter 10, actuators (not shown) of the brake devices B, and a speaker (not shown).

The vehicle Ve is provided with: an accelerator pedal 12 as an operating device of an accelerator that is manipulated by a driver to accelerate and decelerate the vehicle Ve; an accelerator sensor 13 that detects a depression (i.e., a position) of the accelerator pedal 12 to control the output torque of the motor 1 based on a detected depression of the accelerator pedal 12; a brake pedal 14 as an operating device of the brake devices B that is manipulated by the driver to decelerate and stop the vehicle Ve; a brake sensor 15 that detects a depression of the brake pedal 14 and a pedal force applied to the brake pedal 14 to control the brake torques of the brake devices B based on e.g., a detected depression of the brake pedal 14; and a vehicle speed sensor 16 as a rotational speed sensor that detects a rotational speed of the propeller shaft 6. Those sensors 13, 15, and 16 are connected to the ECU 11 so that data collected by the sensors 13, 15, and 16 are sent to the ECU 11 in the form of detection signal.

The vehicle Ve is provided with devices for simulating or imitating the behaviors of conventional vehicles having a manual transmission. For example, the vehicle Ve is provided with a shifting device 17 including a shift lever and a paddle switch as an operating device of the shifting device 17. Specifically, as a shift lever of the conventional manual transmission, the operating device of the shifting device 17 is manipulated to shift a virtual gear stage manually among a plurality of forward stages, a reverse stage, and a neutral stage. During manual shifting in the conventional vehicle having the manual transmission, a torque transmission between the engine and the drive wheels is temporarily interrupted to engage and disengage predetermined gear pairs, and to reduce a shift shock. To this end, a clutch is disengaged by depressing a clutch pedal and engaged by returning the clutch pedal. In order to allow the driver to execute such manual shifting operation virtually, the vehicle Ve is further provided with: a clutch pedal 18 as a virtual torque transmitting capacity changing device that is manipulated to imitate an operation of the clutch of the conventional vehicle having the manual transmission; a shift position sensor 19 that detects a position of the operating device of the shifting device 17 or a virtual gear stage (or mode) selected by operating the shifting device 17; and a clutch position sensor 20 that detects a depression of the clutch pedal 18. In order to operate the clutch, another operating device may also be arranged in a steering wheel (not shown) instead of the clutch pedal 18.

Those sensors 19 and 20 are also connected to the ECU 11 so that data collected by the sensors 19 and 20 are also sent to the ECU 11 in the form of detection signal.

An operating mode of the vehicle Ve may be selected from an EV (i.e., electric vehicle) mode and a virtual manual mode. In the EV mode, the output torque of the motor 1 is controlled to propel and decelerate the vehicle Ve based on a position of the accelerator pedal 12 representing a drive demand. Whereas, in the virtual manual mode, the vehicle Ve is operated while simulating the behavior of the conventional vehicle having a manual transmission. For example, the vehicle Ve is allowed to imitate the behavior of the conventional vehicle having a manual transmission by the procedures described in JP-B2-6787507. The procedures to imitate the behavior of the manual transmission vehicle will be explained briefly hereinafter.

First of all, a conventional vehicle having an engine and a geared transmission connected to an output shaft of the engine is selected as a model vehicle, and specifications of the model vehicle are numerically modeled and stored in the ECU 11. In order to simulate the behavior of the model vehicle, an expected behavior of the model vehicle based on an actual running condition of the vehicle Ve is computed by the ECU 11 based on: an actual depression (or position) of the accelerator pedal 12 detected by the accelerator sensor 13; a position of the shifting device 17 detected by shift position sensor 19; an actual depression of the clutch pedal 18 detected by the clutch position sensor 20; and an actual rotational speed of the propeller shaft 6 detected by the vehicle speed sensor 16. Then, the ECU 11 calculates a target output torque of the motor 1 (including a drive torque and a brake torque) to actualize the expected behavior of the model vehicle, and controls the inverter 10 to allow the motor 1 to generate the target output torque.

Figure 2:
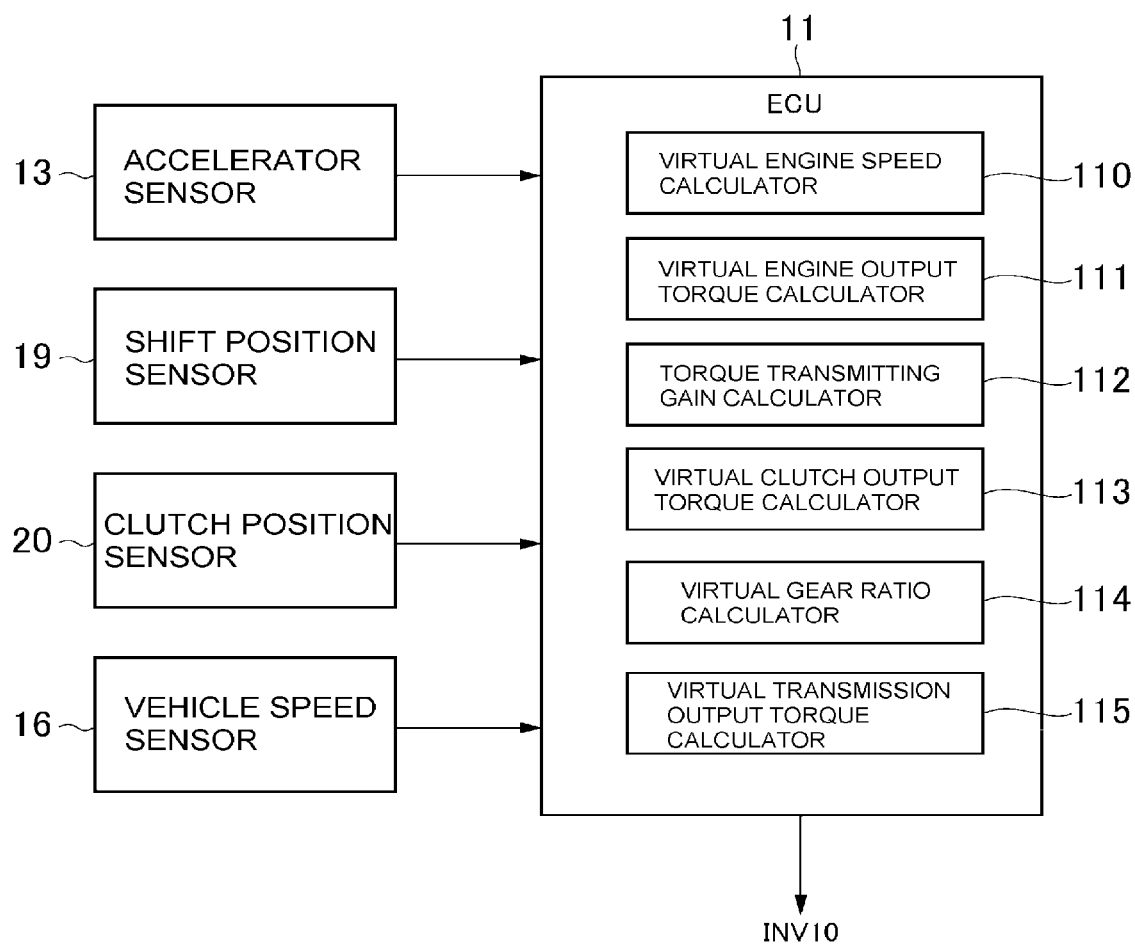
FIG. 2 is a block diagram showing functions of an electronic control unit.

To this end, specifically, a virtual engine speed of the model vehicle in a current running condition of the vehicle Ve is calculated based on the data collected by the above-mentioned sensors 13, 19, 20, and 16. For example, the virtual engine speed may be calculated by multiplying the rotational speed of the propeller shaft 6 detected by the vehicle speed sensor 16: by a speed ratio of the virtual gear stage selected by the shifting device 17; and a slip ratio corresponding to a depression of the clutch pedal 18 detected by the clutch position sensor 20. In a situation where a rotational speed of the propeller shaft 6 is zero, the accelerator pedal 12 is positioned at an initial position without being depressed, and the clutch pedal 18 is depressed to a position which is deeper than a predetermined degree but a clutch device of the model vehicle is not expected to transmit torque, the virtual engine speed may be calculated as a virtual idling speed. Turning to FIG. 2, there are shown functional devices of the ECU 11 to simulate the behavior of the model vehicle. As illustrated in FIG. 2, in order to calculate the virtual engine speed, the ECU 11 is provided with a virtual engine speed calculator 110. According to the exemplary embodiment of the present disclosure, an imitation engine noise may be audible through the speaker based on the calculated virtual engine speed.

A displacement, a relation between a speed and an output torque, an efficiency and so on of the engine of the model vehicle are numerically modeled. Therefore, a virtual engine output torque of the model vehicle may be calculated based on the calculated virtual engine speed and the detected position of the accelerator pedal 12, while with reference to a map determining a relation between a speed and an output torque of the engine of the model vehicle. Specifically, the virtual engine output torque is calculated by a virtual engine output torque calculator 111 of the ECU 11.

The behavior of the model vehicle is simulated on the basis that a friction clutch in which a torque transmitting capacity varies continuously is employed in the model vehicle. In order to simulate the behavior of the model vehicle, a relation between a depression of the clutch pedal 18 and a virtual torque transmitting capacity of the friction clutch of the model vehicle is determined in the form of a map, and such map is stored in the ECU 11. For example, the map is prepared in such a manner that a gain of the virtual torque transmitting capacity varies between 0 and 1. Specifically, the gain of the virtual torque transmitting capacity is maintained to 1 as long as the depression of the clutch pedal 18 falls within a range from 0 to a predetermined angle, and reduced linearly or proportionally from 1 with an increase in the depression of the clutch pedal 18 from the predetermined angle. That is, a virtual clutch output torque of the model vehicle is governed by the above-mentioned gain, which is calculated based on an actual depression of the clutch pedal 18 detected by the clutch position sensor 20 while with reference to the above-mentioned map. Specifically, the gain of the virtual torque transmitting capacity is calculated by a torque transmitting gain calculator 112 of the ECU 11.

As described, the conventional vehicle having the manual transmission is selected as the model vehicle. In the model vehicle, therefore, the output torque of the engine is supposed to be changed in accordance with the above-explained gain of the torque transmitting capacity of the clutch, and the output torque of the engine is supposed to be delivered from the clutch to the manual transmission. Accordingly, the output torque of the clutch of the model vehicle may be simulated by multiplying the virtual engine output torque calculated by the virtual engine output torque calculator 111 by the gain calculated by the torque transmitting gain calculator 112. Specifically, the output torque of the clutch of the model vehicle is simulated as a virtual clutch output torque by a virtual clutch output torque calculator 113 of the ECU 11.

A virtual gear ratio (i.e., a virtual speed ratio) of the manual transmission of the model vehicle is simulated on the basis of current running conditions of the vehicle Ve. According to the embodiment of the present disclosure, the virtual gear ratio of the manual transmission is simulated as a ratio between the virtual engine speed and a virtual output speed of the manual transmission (i.e., a rotational speed of a propeller shaft) of the model vehicle. That is, the virtual gear ratio of the manual transmission may be calculated by dividing the virtual engine speed by a rotational speed of the propeller shaft 6 detected by the vehicle speed sensor 16. Specifically, the virtual gear ratio of the manual transmission is calculated by a virtual gear ratio calculator 114 of the ECU 11.

In order to simulate or imitate the behavior of the model vehicle, it is necessary to control the output torque of the motor 1 in such a manner that a torque of the propeller shaft 6 changes in line with a change in the virtual output torque of the manual transmission of the model vehicle. To this end, the virtual output torque of the manual transmission of the model vehicle is calculated by a virtual transmission output torque calculator 115 of the ECU 11. In the model vehicle, the torque delivered to the manual transmission is changed in accordance with a speed ratio of the manual transmission, and further delivered from the manual transmission. Therefore, the virtual output torque of the manual transmission may be calculated by multiplying the virtual clutch output torque supposed to be delivered to the manual transmission by the speed ratio of the manual transmission. As described, the virtual clutch output torque is governed by the gain calculated by the torque transmitting gain calculator 112. That is, the virtual clutch output torque is changed in accordance with the virtual torque transmitting capacity being changed to simulate an intermittence of torque transmission through the clutch during manual shifting. In order to allow the vehicle Ve to simulate the behavior of the model vehicle during execution of the virtual manual shifting, the ECU 11 controls the inverter 10 in such a manner as to generate the virtual output torque (corresponding to a torque of the propeller shaft 6) calculated by the virtual transmission output torque calculator 115.

In the situation where the model vehicle is stopped while depressing the clutch pedal, the speed of the engine is higher than the output speed of the clutch. In this situation, when the clutch pedal is returned to launch the model vehicle, the engine is subjected to a resistance torque applied from the clutch. Therefore, a drive torque will be delivered through the clutch to launch the model vehicle by generating a torque greater than the resistance torque by the engine. In this situation, if the torque generated by the engine is greater than the resistance torque, a speed of the engine will be increased by a surplus torque of the engine. By contrast, if the torque generated by the engine is smaller than the resistance torque, a speed of the engine will be reduced by a surplus resistance torque.

Therefore, when launching the vehicle Ve, the virtual engine speed calculator 110 calculates a difference between: the virtual engine output torque calculated by the virtual engine output torque calculator 111; and the resistance torque governed by the depression of the clutch pedal 18 and the current virtual engine speed. Then, the virtual engine speed calculator 110 calculates a change rate of the virtual engine speed based on the calculated difference and a predetermined inertia moment of the engine of the model vehicle, and changes (or updates) the virtual engine speed.

When the virtual engine speed falls below a predetermined speed, the ECU 11 executes an engine stall control to simulate or imitate a behavior of the model vehicle in a situation where an engine stall occurs. In order to simulate the engine stall of the model vehicle, specifically, the ECU 11 mutes the imitation engine noise emitted from the speaker, and inhibits a torque generation according to an operation of the accelerator pedal 12. That is, the ECU 11 rejects an acceleration demand.

Figure 3:
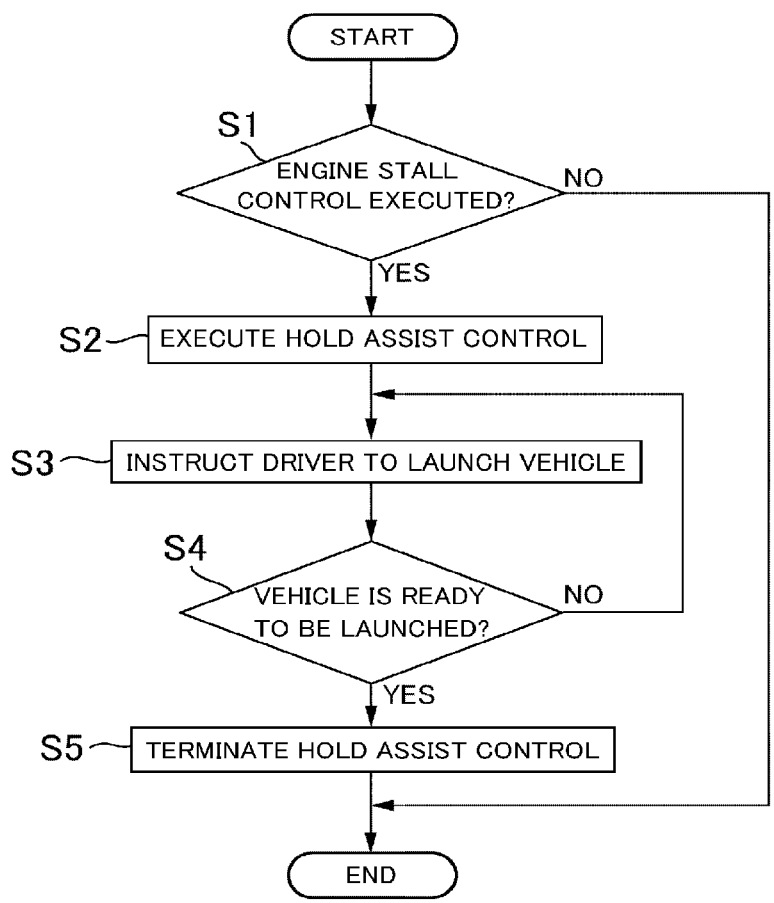
FIG. 3 is a flowchart showing an example of a routine to execute a hold assist control.

However, if the acceleration demand is rejected to simulate the engine stall on an upslope, the vehicle Ve would roll backward on the slope when the driver depresses the clutch pedal 18 to launch the vehicle Ve. In order to prevent such rollback of the vehicle Ve when executing the engine stall control, the ECU 11 is configured to execute a routine shown in FIG. 3.

At step S1, it is determined whether the engine stall control is executed. Such determination at step S1 may be made based on the fact that the virtual engine speed calculated by the virtual engine speed calculator 110 falls below a first threshold speed as a predetermined speed of the embodiment of the present disclosure. For instance, the first threshold speed may be set to a self-sustaining speed of the engine of the model vehicle. Instead, such determination at step S1 may also be made based on the facts that the virtual engine speed is zero and that a flag to reject the acceleration demand is turned on.

If the engine stall control is currently not executed so that the answer of step S1 is NO, the routine returns. By contrast, if the engine stall control is executed so that the answer of step S1 is YES, the routine progresses to step S2 to execute a hold assist control to maintain a position of the vehicle Ve. For example, a conventional hill hold control may be employed as the hold assist control. At step S2, specifically, the wheels 2 and 9 are stopped automatically by the brake devices B even if the brake pedal 14 is not depressed by the driver. As an option, a forward torque counteracting a load to roll the vehicle Ve backward may be generated by the motor 1 irrespective of an operation of the accelerator pedal 12.

Then, at step S3, an instruction (or notification) is issued to launch the vehicle Ve in the condition where the engine stall control is in execution. At step S3, specifically, the driver is instructed to: depress the brake pedal 14 to increase the brake torques established by the brake devices B; depress the clutch pedal 18 to simulate a disengagement of the clutch of the model vehicle; and operate the shifting device 17 to select the first forward stage (i.e., the low stage). For example, the driver may be informed the above-mentioned procedures from the ECU 11 phonically through the speaker. Instead, the above-mentioned procedures may also be indicated in an instrument panel. That is, the driver is informed of the procedures to launch the conventional vehicle having a manual transmission by returning the clutch pedal 18 being depressed while depressing the accelerator pedal 12. In order to simulate the behavior of the model vehicle in a situation to startup the engine, when the brake pedal 14 and the clutch pedal 18 are depressed during execution of the engine stall control, the virtual engine speed is set to the virtual idling speed, and noises and vibrations are generated based on the virtual idling speed. In this situation, the rejection of the acceleration demand is cancelled upon selection of the first forward stage. Instead, the rejection of the acceleration demand may also be cancelled when the brake pedal 14 and the clutch pedal 18 are depressed. That is, the engine stall control is terminated when at least the brake pedal 14 and the clutch pedal 18 are depressed.

Thereafter, it is determined at step S4 whether the vehicle Ve is ready to be launched. Specifically, at step S14, it is determined whether the brake pedal 14, the clutch pedal 18 and the shifting device 17 are operated by the driver in line with the instruction issued at step S3. For example, such determination at step S4 may be made based on detection signals transmitted from the accelerator sensor 13, the brake sensor 15, the shift position sensor 19, and the clutch position sensor 20.

If the vehicle Ve is not ready to be launched so that the answer of step S4 is NO, the routine returns to step S3 to instruct the driver to bring the vehicle Ve into the condition ready to be launched. By contrast, if the vehicle Ve is ready to be launched so that the answer of step S4 is YES, the routine progresses to step S5 to terminate the hold assist control, and thereafter returns.

As described, at step S3, the driver is instructed to operate the shifting device 17 and to launch the vehicle Ve. At step S3, however, it is sufficient to terminate the engine stall control. Therefore, the instructions to operate the shifting device 17 and to launch the vehicle Ve may be omitted. In this case, the determination at step S4 may be made based only on the facts that the brake pedal 14 and the clutch pedal 18 are operated. In other words, the hold assist control may also be terminated before the driver operates the shifting device 17 and the pedals 12, 14, and 18 to launch the vehicle Ve.

Thus, during execution of the engine stall control, the hold assist control may be executed to stop the wheels 2 and 9 by the brakes B thereby maintaining a position of the vehicle Ve. Therefore, the roll-back of the vehicle Ve on the slope may be prevented when releasing the brake pedal 14 while depressing the clutch pedal 18 to launch the vehicle Ve. That is, it is not necessary to inhibit execution of the engine stall control itself even in the unfavorable situation, and hence the behavior of the model vehicle may be simulated in detail.

However, some highly skilled drivers may feel annoyed by the hold assist control if the hold assist control is executed every time the engine stall control is executed. According to the exemplary embodiment of the present disclosure, the ECU 11 is further configured to execute a routine shown in FIG. 4 so as to selectively execute the hold assist control depending on the driving skill of the driver and the situation. In the following descriptions, explanations for the steps in common with those in the routine shown in FIG. 3 will be omitted.

Figure 4:
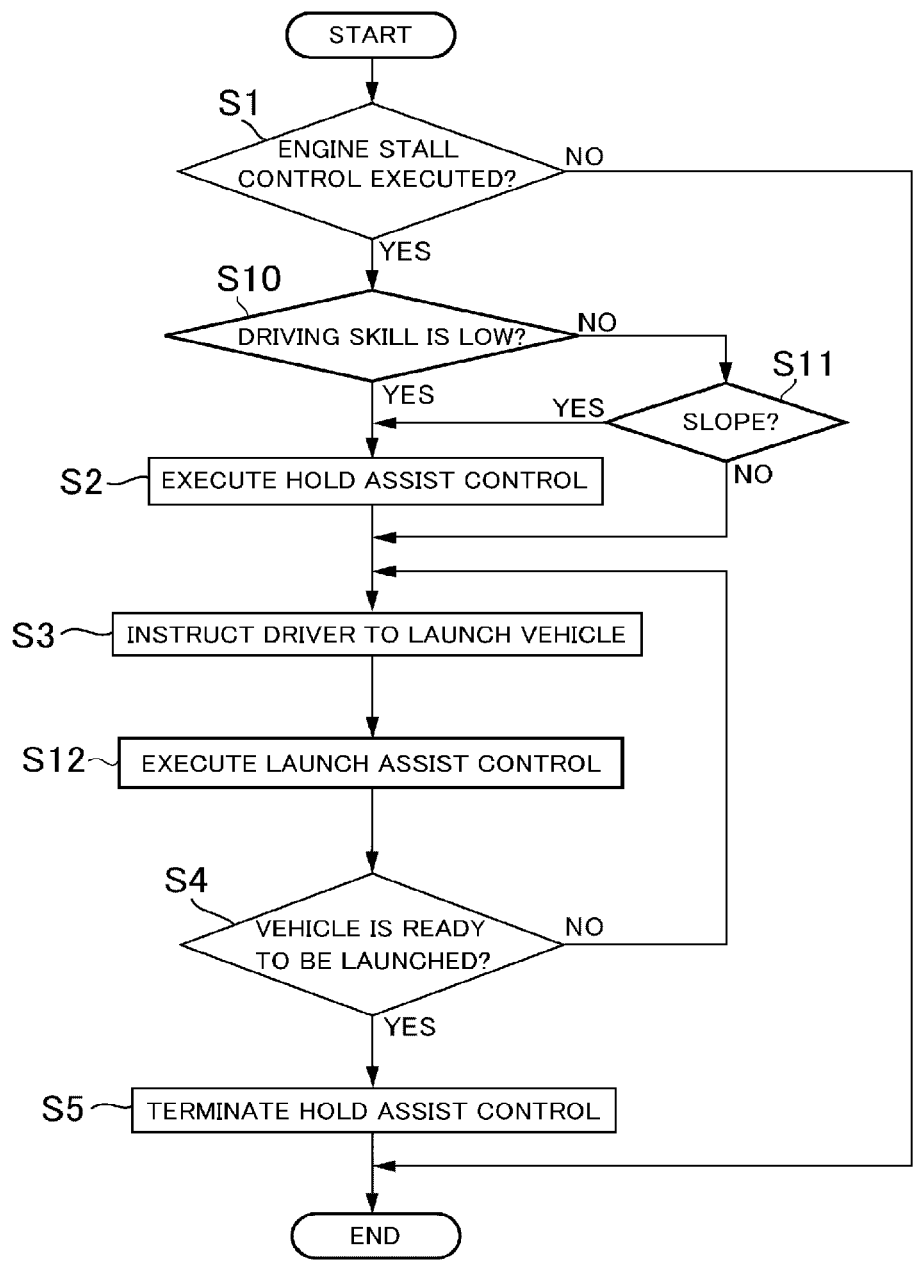
FIG. 4 is a flowchart showing an example of a routine to selectively execute the hold assist control depending on a driving skill of a driver.

In the routine shown in FIG. 4, if the engine stall control is executed so that the answer of step S1 is YES, the routine progresses to step S10 to determine whether the driving skill of the driver is low. In order to make such determination at step S10, for example, the driver may be allowed to input his/her driving skill manually to the ECU 11 through a touch panel. Instead, the driving skill of the driver may also be determined based on a driving history of the driver recorded in the ECU 11.

If the driving skill of the driver is low so that the answer of step S10 is YES, the routine progresses to step S2 to execute the hold assist control. By contrast, if the driving skill of the driver is not low so that the answer o step S10 is NO, the routine progresses to step S11 to determine whether the vehicle Ve is positioned on a slope. That is, it is determined at step S11 whether it is preferable to execute the hold assist control. In this situation, the answer of step S11 will be YES if the vehicle Ve is positioned not only on an upslope but also on a downslope. For example, such determination at step S11 may be made based on a detection value of an acceleration sensor (not shown) or road information obtained through a navigation system (not shown).

If the vehicle is positioned on a slope so that the answer of step S11 is YES, the routine progresses to step S2 to execute the hold assist control. By contrast, if the vehicle is not positioned on a slope so that the answer of step S11 is NO, the routine progresses to step S3 to instruct the driver to bring the vehicle Ve into the condition ready to be launched. That is, the hold assist control is not executed in this case.

As an option, the driving skill of the driver may be catabolized into three levels to determine the necessity to execute the hold assist control. In this case, if the driving skill of the driver is a low level, the hold assist control will be executed irrespective of whether the vehicle Ve is positioned on a slope, and if the driving skill of the driver is an intermediate level, the hold assist control will be executed only when the vehicle Ve is positioned on a slope. By contrast, if the driving skill of the driver is a high level, the hold assist control will not be executed irrespective of whether the vehicle Ve is positioned on a slope. Otherwise, if the driving skill of the driver is a high level, the hold assist control may be executed only when an obstacle exists in a rolling direction of the vehicle Ve. For example, given that the vehicle Ve is positioned on a downslope, the hold assist control may be executed if another vehicle exists in front of the vehicle Ve. Whereas, given that the vehicle Ve is positioned on an upslope, the hold assist control may be executed if another vehicle exists behind the vehicle Ve. For instance, an existence of the obstacle may be determined based on data collected by an on-board camera (not shown).

After instructing the driver to bring the vehicle Ve into the condition ready to be launched at step S3, the routine progresses to step S12 to execute a launch assist control in order not to execute the engine stall control again. Specifically, in order to inhibit the engine stall control, a lower limit value of the virtual engine speed is set to or higher than the first threshold speed as the self-sustaining speed of the engine of the model vehicle at which the engine stall control is executed. Instead, an execution of the launch assist control may also be determined based on the driving skill of the driver. In this case, if the driving skill of the driver is a low level, the launch assist control will be executed irrespective of whether the vehicle Ve is positioned on a slope, and if the driving skill of the driver is an intermediate level, the launch assist control will be executed only when the vehicle Ve is positioned on a slope. By contrast, if the driving skill of the driver is a high level, the launch assist control will not be executed irrespective of whether the vehicle Ve is positioned on a slope. Otherwise, if the driving skill of the driver is a high level, the launch assist control may be executed only when an obstacle exists in front of or behind the vehicle Ve.

Thus, according to the exemplary embodiment of the present disclosure, the hold assist control and the launch assist control may be executed selectively depending of the driving skill of the driver. According to the exemplary embodiment of the present disclosure, therefore, even the highly skilled driver may enjoy driving the vehicle Ve according to his/her preference, without feeling annoyed by an excessive assist control.

In addition, the control system according to the exemplary embodiment of the present disclosure is further configured to simulate a behavior of the model vehicle in a situation just before the occurrence of an engine stall. To this end, the ECU 11 executes a routine shown in FIG. 5, and in the following descriptions, explanations for the steps in common with those in the foregoing routines will be omitted.

Figure 5:
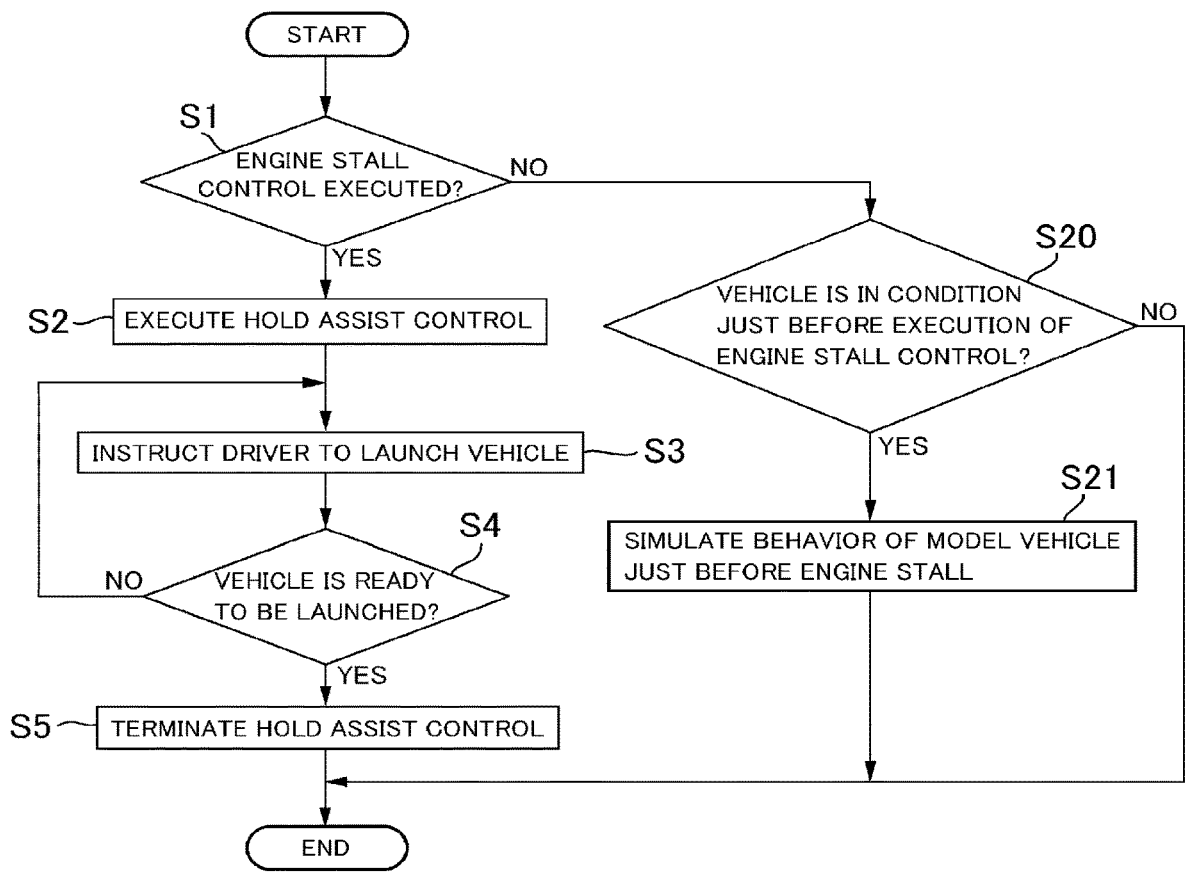
FIG. 5 is a flowchart showing an example of a routine to simulate a behavior of a model vehicle just before an occurrence of an engine stall.

In the routine shown in FIG. 5, if the engine stall control is currently not executed so that the answer of step S1 is NO, the routine progresses to step S20 to determine whether the vehicle Ve is in a condition immediately before an execution of the engine stall control. At step S20, specifically, it is determined whether the virtual engine speed calculated by the virtual engine speed calculator 110 falls below a second threshold speed set to e.g., an idling speed of the engine of the model vehicle. That is, the answer of step S20 will be YES if the virtual engine speed is higher than the first threshold speed but lower than the second threshold speed.

If the virtual engine speed is higher than the second threshold speed so that the answer of step S20 is NO, the routine returns. By contrast, if the virtual engine speed is higher than the first threshold speed but lower than the second threshold speed so that the answer of step S20 is YES, the routine progresses to step S21 to simulate the behavior of the model vehicle in the situation just before the occurrence of an engine stall, and thereafter returns. At step S21, specifically, the behavior of the model vehicle in the situation just before the occurrence of an engine stall is simulated by changing the imitation engine noise emitted from the speaker with a reduction in the virtual engine speed, while pulsating the torque of the motor 1 to generate longitudinal vibrations. That is, at step S21, the driver is allowed to sense an execution of the engine stall control in the immediate future. In this situation, therefore, the driver is allowed to prevent an execution of the engine stall control by e.g., depressing the accelerator pedal 12 while returning the clutch pedal 18.

Thus, when the vehicle Ve is in condition just before the execution of the engine stall control, the behavior of the model vehicle in the situation just before the occurrence of an engine stall is simulated. Therefore, the driver is allowed to sense an execution of the engine stall and to prevent an execution of the engine stall control by manipulating the accelerator pedal 12 and the clutch pedal 18.

Although the above exemplary embodiment of the present disclosure has been described, it will be understood by those skilled in the art that the present disclosure should not be limited to the described exemplary embodiments, and various changes and modifications can be made within the scope of the present disclosure. For example, a dedicated drive motor and a generator may also be adopted as the motor 1 instead of the motor-generator. In addition, the virtual speed ratio may also be calculated based on a rotational speed of another rotary member corresponding to the speed of the vehicle Ve, instead of the rotational speed of the propeller shaft 6.

What is claimed is:

1. A control system for an electric vehicle having a rotary machine that delivers a torque to a wheel and a brake device that applies a brake torque to the wheel, but without having an engine, a transmission connected to the engine, and a clutch device, comprising:
    an operating device of an accelerator that is manipulated by a driver to accelerate and decelerate the electric vehicle;
    an operating device of a shifting device that is manipulated by the driver to imitate an operation of a manual transmission of a conventional vehicle having the manual transmission;
    a virtual torque transmitting capacity changing device that is manipulated to imitate an operation of a clutch of the conventional vehicle; and
    a controller that controls the brake device,
    wherein the controller comprises a virtual engine speed calculator that calculates a virtual engine speed as a speed of an engine of the conventional vehicle in an actual running condition of the electric vehicle based on positions of the operating device of the accelerator and the virtual torque transmitting capacity changing device, and
    the controller is configured to
        execute an engine stall control to simulate a behavior of the conventional vehicle in a situation where an engine stall occurs by stopping a rotation and a torque generation of the rotary machine, when the virtual engine speed calculated by the virtual engine speed calculator falls below a predetermined speed, and
        execute a hold assist control to apply the brake torque to the wheel by the brake device upon execution of the engine stall control.

2. The control system for the electric vehicle as claimed in claim 1, wherein the controller is further configured to:
    determine an output torque of the rotary machine based on the position of the operating device of the accelerator; and
    inhibit a torque generation of the rotary machine based on the position of the operating device of the accelerator upon execution of the engine stall control.

3. The control system for the electric vehicle as claimed in claim 1, wherein the controller is further configured to instruct the driver to launch the electric vehicle upon execution of the engine stall control.

4. The control system for the electric vehicle as claimed in claim 3, further comprising:
    an operating device of the brake device that is manipulated by the driver to control the brake torque established by the brake device,
    wherein the controller is further configured to instruct the driver to operate the operating device of the brake device to increase the brake torque, and to operate the virtual torque transmitting capacity changing device to reduce a gain of a virtual torque transmitting capacity, so as to launch the electric vehicle upon execution of the engine stall control.

5. The control system for the electric vehicle as claimed in claim 4, wherein the controller is further configured to terminate the engine stall control when the operating device of the brake device and the virtual torque transmitting capacity changing device are operated.

6. The control system for the electric vehicle as claimed in claim 1, wherein the controller is further configured to:
    determine a driving skill of the driver; and
    execute the hold assist control if the driving skill of the driver is low.

7. The control system for the electric vehicle as claimed in claim 6, wherein the controller is further configured to execute the hold assist control if the driving skill of the driver is high and the electric vehicle is stopped on a slope.

8. The control system for the electric vehicle as claimed in claim 6, wherein the controller is further configured to execute the hold assist control if the driving skill of the driver is high and another vehicle exists in a rolling direction of the electric vehicle.

9. The control system for the electric vehicle as claimed in claim 1, wherein the controller is further configured to terminate the hold assist control if the electric vehicle is in a condition ready to be launched.

10. The control system for the electric vehicle as claimed in claim 1, wherein the controller is further configured to execute a launch assist control upon execution of the engine stall control in order not to execute the engine stall control again.

11. The control system for the electric vehicle as claimed in claim 10, wherein the launch assist control includes a control to inhibit an execution of the engine stall control by setting a lower limit value of the virtual engine speed calculated by the virtual engine speed calculator to the predetermined speed or higher.

* * * * *